United States Patent
Wang

(10) Patent No.: US 10,169,277 B2
(45) Date of Patent: Jan. 1, 2019

(54) CAPABILITY DETERMINING METHOD, CAPABILITY CONFIGURATION METHOD, HOST, TERMINAL DEVICE, AND SYSTEM

(71) Applicant: Huawei Device (Shenzhen) Co., LTD., Shenzhen (CN)

(72) Inventor: Yeqi Wang, Shenzhen (CN)

(73) Assignee: Huawei Device (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/115,448

(22) PCT Filed: Feb. 26, 2015

(86) PCT No.: PCT/CN2015/073303
§ 371 (c)(1),
(2) Date: Jul. 29, 2016

(87) PCT Pub. No.: WO2015/127893
PCT Pub. Date: Sep. 3, 2015

(65) Prior Publication Data
US 2017/0177524 A1    Jun. 22, 2017

(30) Foreign Application Priority Data
Feb. 26, 2014    (CN) .......................... 2014 1 0067075

(51) Int. Cl.
*G06F 13/38* (2006.01)
*G06F 13/10* (2006.01)
*G06F 13/36* (2006.01)

(52) U.S. Cl.
CPC .......... *G06F 13/387* (2013.01); *G06F 13/102* (2013.01); *G06F 13/36* (2013.01)

(58) Field of Classification Search
CPC ............................... G06F 13/387; G06F 13/36
See application file for complete search history.

(56) References Cited

U.S. PATENT DOCUMENTS 6,411,724 B1 * 6/2002 Vaithilingam .... G06F 17/30038
382/100
6,894,706 B1 * 5/2005 Ward ........................ G06F 3/14
345/428
(Continued)

FOREIGN PATENT DOCUMENTS

CN        1780282 A       5/2006
EP        1898306 A1      3/2008
(Continued)

OTHER PUBLICATIONS

Sourcequest et al., "Microsoft OS Descriptors," Oct. 18, 2004, pp. 1-5.

*Primary Examiner* — Henry Tsai
*Assistant Examiner* — John B Roche
(74) *Attorney, Agent, or Firm* — Slater Matsil, LLP

(57) ABSTRACT

A capability determining method for a terminal device, a host, and a system is provided. The capability determining method includes acquiring, by the host, a capability supported by the terminal device. The method also includes determining, by the host according to the capability supported by the terminal device and a capability supported by the host, a capability supported by both the terminal device and the host, and using the capability supported by both the terminal device and the host as an overlapping capability, where the overlapping capability is used by the terminal device to perform capability configuration. The method also includes sending the overlapping capability to the terminal device.

15 Claims, 4 Drawing Sheets

(56) References Cited

U.S. PATENT DOCUMENTS

| | | | |
|---|---|---|---|
| 2004/0203296 A1* | 10/2004 | Moreton | G06F 13/387 |
| | | | 439/894 |
| 2007/0105548 A1* | 5/2007 | Mohan | H04M 1/725 |
| | | | 455/426.1 |
| 2007/0245055 A1 | 10/2007 | Minami | |
| 2011/0158016 A1* | 6/2011 | Rimondi | G11C 29/02 |
| | | | 365/201 |
| 2012/0179845 A1* | 7/2012 | Nie | G06F 13/102 |
| | | | 710/14 |
| 2013/0198417 A1 | 8/2013 | Takashima | |
| 2013/0282930 A1 | 10/2013 | Gubitz et al. | |

FOREIGN PATENT DOCUMENTS

| | | |
|---|---|---|
| JP | 2007279932 A | 10/2007 |
| JP | 2013175167 A | 9/2013 |

\* cited by examiner

CAPABILITY DETERMINING METHOD, CAPABILITY CONFIGURATION METHOD, HOST, TERMINAL DEVICE, AND SYSTEM

CROSS-REFERENCE TO RELATED APPLICATIONS

This patent application is a national phase filing under section 371 of PCT/CN2015/073303, filed on Feb. 26, 2015, which claims priority to Chinese Patent Application 201410067075.1, filed with the Chinese Patent Office on Feb. 26, 2014 and entitled "CAPABILITY DETERMINING METHOD, CAPABILITY CONFIGURATION METHOD, HOST, TERMINAL DEVICE, AND SYSTEM", both of which are incorporated herein by reference in their entireties.

TECHNICAL FIELD

The present invention relates to terminal devices, and in particular, to a capability determining method for a terminal device, a capability configuration method for a terminal device, a host, a terminal device, and a configuration system for a terminal device.

BACKGROUND

Generally, a multi-function device, for example, a universal serial bus (USB) device, works in a default function (for example, a function 1) mode, and when a particular condition (for example, a driver of a function 2 is installed) is met, the multi-function device is switched to a function 2 mode, and works in the function 2 mode. When a common multi-function device, for example, a USB 3G WAN card, is in a default working mode, the common multi-function device works in a USB virtual optical disk manner, and after a user installs an optical disk driver program, the common multi-function device works in a modem or network interface card manner. However, each time the common multi-function device is used, re-enumeration (that is, searching) of a USB needs to be performed once, which lowers user experience.

Based on this, multi-function selection is generally implemented by using multiple configurations. That is, a USB device has multiple configurations, and each Configuration implements a different function, for example, C1: Modem; C2: network adapter; C3: global positioning system (GPS). A host enables, by setting different configurations, the USB device to work in different function modes.

However, in an existing implementation manner, because capabilities supported by the host are not exactly identical with capabilities supported by the USB device, the host cannot automatically perform configuration according to the capabilities supported by the host or the capabilities of the USB device, which therefore lowers user experience.

SUMMARY

In Embodiments of the present invention provide a capability determining method for a terminal device, a configuration method for a terminal device, a host, a terminal device, and a configuration system for a terminal device, so as to resolve a problem in the prior art that because capabilities supported by a host and a terminal device are not exactly identical, the host cannot perform flexible configuration on the terminal device according to the capabilities supported by the host.

To resolve the foregoing technical problem, the embodiments of the present invention disclose the following technical solutions:

A first aspect provides a capability determining method for a terminal device. The method includes acquiring, by a host, a capability supported by a terminal device. The method also includes determining, by the host according to the capability supported by the terminal device and a capability supported by the host, a capability supported by both the terminal device and the host, and using the capability supported by both the terminal device and the host as an overlapping capability, where the overlapping capability is used by the terminal device to perform capability configuration. The method also includes sending the overlapping capability to the terminal device.

In a first possible implementation manner of the first aspect, the method further includes: when a configuration success message sent by the terminal device is received, enumerating at least one subdevice, configured with the overlapping capability, in the terminal device; and performing driver loading on the at least one subdevice, so that the at least one subdevice implements a function corresponding to the overlapping capability.

With reference to the first aspect or the first possible implementation manner of the first aspect, in a second possible implementation manner, the acquiring, by a host, a capability supported by a terminal device includes: receiving, by the host, a descriptor sent by the terminal device, where the descriptor includes MS_COMP_ID and MS SUB-COMP_ID; and starting, by the host, a corresponding driver according to the MS_COMP_ID, and parsing the MS SUB-COMP_ID by using the driver, to obtain the capability supported by the terminal device.

A second aspect provides a capability configuration method for a terminal device. The method includes: sending, by a terminal device, a capability supported by the terminal device to a host. The method also includes receiving, by the terminal device, an overlapping capability sent by the host, where the overlapping capability is a capability that is supported by both the terminal device and the host and that is determined by the host according to the capability supported by the terminal device and a capability supported by the host. The method also includes performing, by the terminal device, configuration according to the overlapping capability.

In a first possible implementation manner of the second aspect, the method further includes: sending, by the terminal device, a configuration success message to the host, so that the host enumerates at least one subdevice, configured with the overlapping capability, in the terminal device, and performs driver loading on the at least one subdevice, so that the at least one subdevice implements a function corresponding to the overlapping capability.

With reference to the second aspect or the first possible implementation manner of the second aspect, in a second possible implementation manner, the sending, by a terminal device, a capability supported by the terminal device to a host includes: sending, by a terminal device, MS_COMP_ID and MS SUBCOMP_ID to the host by using a descriptor, so that the host starts a corresponding driver by using the MS SUBCOMP_ID, and parses the MS SUB-COMP_ID by using the driver, to obtain the capability supported by the terminal device.

A third aspect provides a host. The host includes an acquiring unit, configured to acquire a capability supported by a terminal device. The host also includes a determining unit, configured to determine, according to the capability supported by the terminal device and a capability supported by the host, a capability supported by both the terminal device and the host, and use the capability supported by both the terminal device and the host as an overlapping capability, where the overlapping capability is used by the terminal device to perform capability configuration. The host also includes a sending unit, configured to send the overlapping capability to the terminal device.

In a first possible implementation manner of the third aspect, the host further includes: a receiving unit, configured to receive a configuration success message sent by the terminal device; an enumeration unit, configured to: when the receiving unit receives the configuration success message, enumerate at least one subdevice, configured with the overlapping capability, in the terminal device; and a loading unit, configured to perform driver loading on the at least one subdevice, so that the at least one subdevice implements a function corresponding to the overlapping capability.

With reference to the third aspect or the first possible implementation manner of the third aspect, in a second possible implementation manner, the acquiring unit includes: a code receiving unit, configured to receive a descriptor sent by the terminal device, where the descriptor includes MS_COMP_ID and MS SUBCOMP_ID. The acquiring unit also includes a starting unit, configured to start a corresponding driver according to the MS_COMP_ID. The acquiring unit also includes a parsing unit, configured to parse the MS SUBCOMP_ID by using the driver started by the starting unit, to obtain the capability supported by the terminal device.

A fourth aspect provides a terminal device. The terminal device includes a first sending unit, configured to send a capability supported by the terminal device to a host. The terminal device also includes a receiving unit, configured to receive an overlapping capability sent by the host, where the overlapping capability is a capability that is supported by both the terminal device and the host and that is determined by the host according to the capability supported by the terminal device and a capability supported by the host. The terminal device also includes a configuration unit, configured to perform configuration on the overlapping capability.

In a first possible implementation manner of the fourth aspect, the terminal device further includes: a second sending unit, configured to send a configuration success message to the host, so that the host enumerates at least one subdevice, configured with the overlapping capability, in the terminal device, and performs driver loading on the at least one subdevice, so that the at least one subdevice implements a function corresponding to the overlapping capability.

With reference to the fourth aspect or the first possible implementation manner of the fourth aspect, in a second possible implementation manner, the first sending unit is specifically configured to send MS_COMP_ID and MS SUBCOMP_ID to the host by using a descriptor, so that the host starts a corresponding driver by using the MS SUBCOMP_ID, and parses the MS SUBCOMP_ID by using the driver, to obtain the capability supported by the terminal device.

A fifth aspect provides a configuration system for a terminal device. The system includes: a host and a terminal device connected to the host. The host is configured to acquire a capability supported by the terminal device, and determine, according to the capability supported by the terminal device and a capability supported by the host, a capability supported by both the terminal device and the host, and use the capability supported by both the terminal device and the host as an overlapping capability, where the overlapping capability is used by the terminal device to perform capability configuration. The host is also configured to send the overlapping capability to the terminal device. The terminal device is configured to receive the overlapping capability, and perform configuration according to the overlapping capability.

In a first possible implementation manner of the fifth aspect, the terminal device is further configured to send a configuration success message to the host; and the host is further configured to: when the configuration success message sent by the terminal device is received, enumerate at least one subdevice, configured with the overlapping capability, in the terminal device, and perform driver loading on the at least one subdevice, so that the at least one subdevice implements a function corresponding to the overlapping capability.

With reference to the fifth aspect or the first possible implementation manner of the fifth aspect, in a second possible implementation manner, that the host acquires a capability supported by the terminal device specifically includes: the host receives a descriptor sent by the terminal device, where the descriptor includes MS_COMP_ID and MS SUBCOMP_ID; and starts a corresponding driver according to the MS_COMP_ID, and parses the MS SUBCOMP_ID by using the driver, to obtain the capability supported by the terminal device.

It can be known from the foregoing embodiments that, in the embodiments of the present invention, a host first determines a capability (that is, an overlapping capability) supported by both the host and a terminal device, and notifies the terminal device of the overlapping capability, so that the terminal device configures the overlapping capability; next, the host enumerates at least one subdevice configured with the overlapping capability, and performs driver loading on the at least one subdevice, so that the at least one subdevice has a function corresponding to the overlapping capability, thereby implementing that different drivers are automatically loaded to meet a terminal device having different functions. That is, when functions supported by the host and the terminal device (for example, a USB device) are not exactly identical, the host negotiates with the terminal device about the functions, and finds out a function supported by both the host and the terminal device, to perform configuration and driver loading, which improves user experience, and reduces a quantity of times for enumerating and reporting, when the terminal device receives a function needed by the host, a corresponding interface to be used by the host.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following descriptions show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Figure 1:
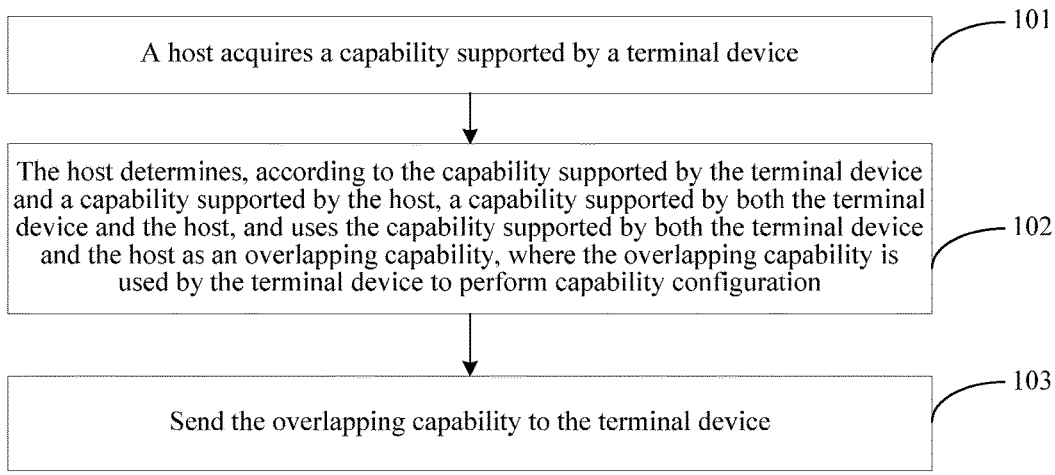
FIG. 1 is a flowchart of a capability determining method for a terminal device according to an embodiment of the present invention.

Referring to FIG. 1, FIG. 1 is a flowchart of a capability determining method for a terminal device according to an embodiment of the present invention. The method includes the following steps.

Step 101: A host acquires a capability supported by a terminal device.

In this step, when the terminal device is connected to the host, the terminal device sends MS_COMP_ID and MS SUBCOMP_ID to the host by using a descriptor (or a USE descriptor); after receiving the descriptor, the host starts a corresponding driver by using the MS_COMP_ID, and parses the MS SUBCOMP_ID by using the driver, to obtain the capability supported by the terminal device. Both the MS_COMP_ID and the MS SUBCOMP_ID are dedicated names defined in MS_OS_Descripters, and are not described in detail herein again.

The terminal device in this embodiment is described by using a USB device as an example, and is not limited to the example. In this embodiment, the USB device specifically has the following functional characteristics.

There is generally a USB interface on the USB device, the USB device is connected to the host through the USB interface, the USB device may store the MS_COMP_ID and the MS_SUBCOMP_ID, for example, USB\MS_COMP_TEST&MS_SUBCOMP_ID, and the oblique-type portion is determined by the USB device; certainly, after receiving a command sent by the host, the USB device may also generate corresponding MS_COMP_ID and MS_SUBCOMP_ID according to the command. TEST is a keyword matching a driver, so that the host matches a corresponding special driver according to TEST after receiving MS_COMP_TEST, where a role of the special driver is parsing the MS_SUBCOMP_ID, to obtain the capability supported by the terminal device; SUBCOMP_ID is a character string that corresponds to a bit map (BIT MAP) number, and each bit in BIT MAP represents a function supported by a current device, for example:

0001h: modem (Modem);
0010h: network adapter (Net Adapter);
0100h: global positioning system (GPS, Global Position System); and
1000h: bit torrent (BT, BitTorrent)

If a value of SUB COMP is 0xD (1101), it represents that a current USB device may support Modem, GPS, and BT.

Next, HOST may match a corresponding special driver by using the received MS_COMP_ID, and parse received the MS SUBCOMP_ID by using the special driver, to obtain a capability of the current USB device. For example, when the capability of the USB device is 5, it indicates that the USB device supports Modem, GPS, BT and the like.

It should be noted that, in this embodiment, TEST corresponds to the USB interface, and the USB interface may also correspond to, in addition to the special driver, another driver, which is not limited in this embodiment.

Step 102: The host determines, according to the capability supported by the terminal device and a capability supported by the host, a capability supported by both the terminal device and the host, and uses the capability supported by both the terminal device and the host as an overlapping capability, where the overlapping capability is used by the terminal device to perform capability configuration.

In this step, one determining manner is: The host performs an AND operation on the capability supported by the USB device and the capability supported by the host, to obtain a capability that can be supported by both the host and the USB device. In this embodiment, the capability that can be supported by both the host and the USB device is referred to as an overlapping capability. It should be noted that, a manner for determining the overlapping capability is not limited to the AND operation, and another operation manner may be performed, which is not limited in this embodiment.

For example, a driver of the Host supports only Modem and BT, and the USB device supports Modem, GPS, and BT; therefore, a result of an AND operation is 0x9 (1001), indicating that both the Host and the USB device can support Modem and BT.

Step 103: Send the overlapping capability to the terminal device.

In this step, the driver of the Host sends the overlapping capability that is obtained after the AND operation to the USB device, so that the terminal device configures the overlapping capability.

Optionally, in this embodiment, the host may send, by using a command defined by a USB vendor, the overlapping capability that is obtained after the AND operation to the USB device. The USB device configures the overlapping capability according to the command, and after the configuration succeeds, sends a configuration success message to the Host.

In this embodiment of the present invention, a host first acquires all capabilities supported by a terminal device, then determines a capability (that is, an overlapping capability) supported by both the host and the terminal device, and notifies the terminal device of the overlapping capability, so that the terminal device configures the overlapping capability. That is, when capabilities supported by the host and the terminal device (for example, a USB device) are not exactly identical, the host negotiates with the terminal device about functions, and finds out a function that is supported by both the host and the terminal device, to perform configuration, which therefore implements that flexible configuration is performed on the terminal device according to the capability supported by the terminal device, and also improves user experience.

Figure 2:
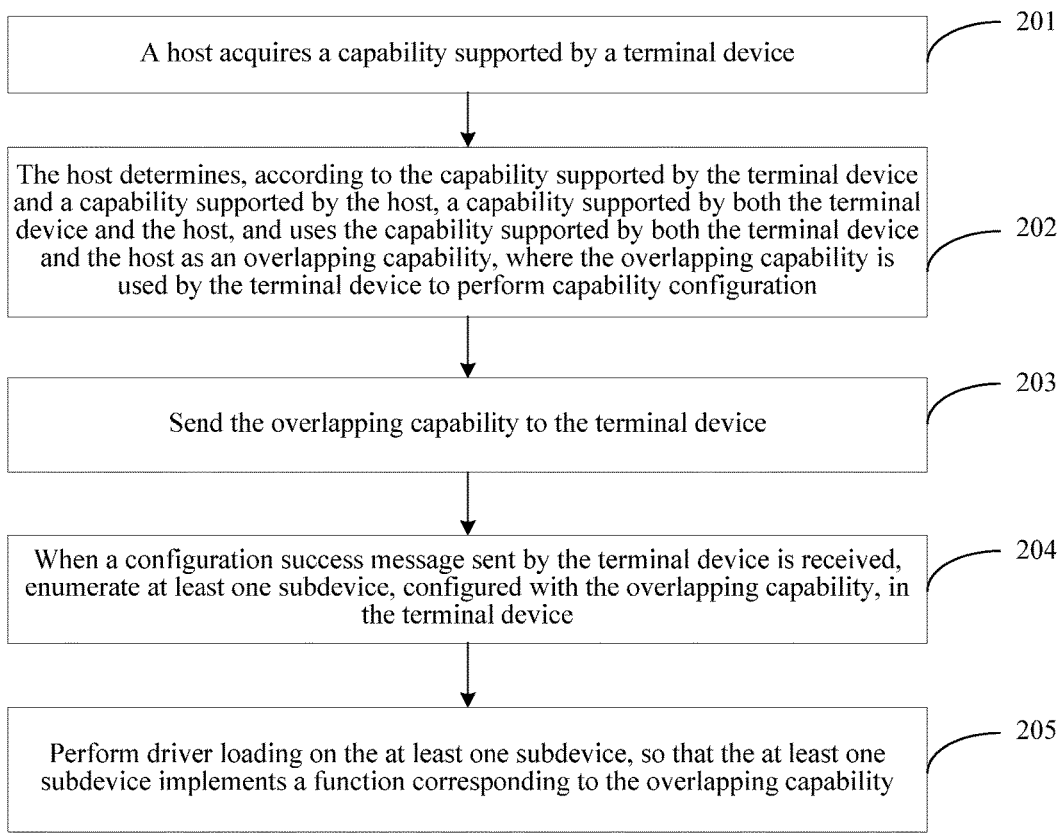
FIG. 2 is another flowchart of a capability determining method for a terminal device according to an embodiment of the present invention.

Referring to FIG. 2, FIG. 2 is another flowchart of a capability determining method for a terminal device according to an embodiment of the present invention. The method includes the following steps.

For details of step 201 to step 203, see step 101 to step 103.

Step 204: When a configuration success message sent by the terminal device is received, enumerate at least one subdevice, configured with the overlapping capability, in the terminal device.

When receiving a configuration success message sent by a configuration USB device, the host enumerates at least one subdevice (that is, a virtual device obtained after logical division of the USB device, and referred to as a subdevice herein) according to the overlapping capability. For example, if an overlapping capability obtained through an AND operation is 0x9, the host may enumerate two subdevices, where one is Modem, and the other is BT, or may enumerate one subdevice of the two subdevices, which is not limited in this embodiment.

Step 205: Perform driver loading on the at least one subdevice, so that the at least one subdevice implements a function corresponding to the overlapping capability.

In this step, if the host enumerates two subdevices, driver loading is performed on the two subdevices, and after the driver loading is completed, the two subdevices have the function corresponding to the overlapping capability.

In this embodiment of the present invention, a host first determines a capability (that is, an overlapping capability) supported by both the host and a terminal device, and notifies the terminal device of the overlapping capability, so that the terminal device configures the overlapping capability; next, the host enumerates at least one subdevice configured with the overlapping capability, and performs driver loading on the at least one subdevice, so that the at least one subdevice has a function corresponding to the overlapping capability. That is, when capabilities supported by the host and the terminal device (for example, a USB device) are not exactly identical, the host negotiates with the terminal device about functions, and finds out a function that is supported by both the host and the terminal device, to perform configuration and driver loading, which reduces a quantity of enumerations of the terminal device, improves user experience, and also implements that requirements of different terminal devices are met by using different drivers.

Figure 3:
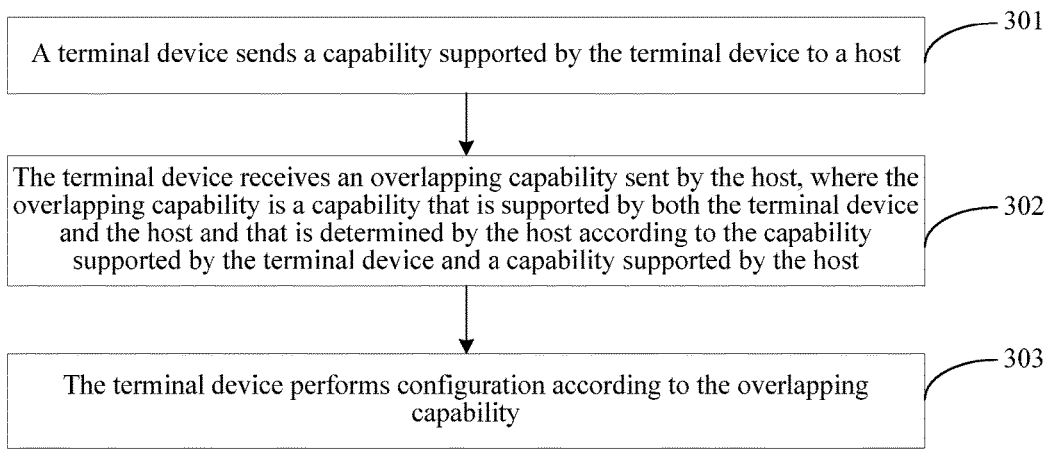
FIG. 3 is a flowchart of a capability configuration method for a terminal device according to an embodiment of the present invention.

Referring to FIG. 3, FIG. 3 is a flowchart of a capability configuration method for a terminal device according to an embodiment of the present invention. The method includes the following steps.

Step 301: A terminal device sends a capability supported by the terminal device to a host.

In this step, for the terminal device, a USB device is used as an example, and the terminal device is not limited to the example. The USB device sends a capability supported by the USB device to the host, so that after receiving the capability supported by the USB device, the host determines, according to the capability supported by the USB device and a capability of the host, a capability supported by both the USB device and the host. In this embodiment, the capability supported by both the USB device and the host is referred to as an overlapping capability. Next, the host sends the determined overlapping capability to the terminal device.

The host may determine, through an AND operation, the capability supported by both the host and the USB device; however, the present invention is not limited thereto. The capability supported by both the host and the USB device may further be determined by using another similar calculation method.

Optionally, in this embodiment, after the terminal device is connected to the host, the terminal device sends MS_COMP_ID and MS SUBCOMP_ID to the host by using a descriptor. After receiving the descriptor, the host starts a corresponding driver by using the MS_COMP_ID, and parses the MS SUBCOMP_ID by using the driver, to obtain the capability supported by the USB device.

Step 302: The terminal device receives an overlapping capability sent by the host, where the overlapping capability is a capability that is supported by both the terminal device and the host and that is determined by the host according to the capability supported by the terminal device and a capability supported by the host.

Optionally, in this step, the terminal device may receive, by using a command defined by a vendor, the overlapping capability that is supported by both the host and the terminal device and that is sent by the host.

Step 303: The terminal device performs configuration according to the overlapping capability.

The terminal device configures a function corresponding to the overlapping capability on at least one corresponding subdevice.

Optionally, after performing parameter configuration according to the overlapping capability, the terminal device sends a configuration success message to the host, so that the host enumerates at least one subdevice, configured with the overlapping capability, in the terminal device; and performs driver loading on the at least one subdevice, so that the at least one subdevice implements a function corresponding to the overlapping capability.

In this embodiment of the present invention, a terminal device (for example, a USB device) first notifies a host of a capability supported by the terminal device, so that the host determines a capability (that is, an overlapping capability) supported by both the terminal device and the host, and notifies the terminal device of the overlapping capability; therefore, the terminal device configures the overlapping capability. That is, when capabilities supported by the host and the terminal device are not exactly identical, the host negotiates with the terminal device about functions, finds out a capability supported by both the host and the terminal device, and notifies the terminal device of the capability, so that the terminal device performs corresponding configuration, that is, the host may flexibly configure a function of the terminal device according to the capability of the terminal device and the capability of the host.

Figure 4:
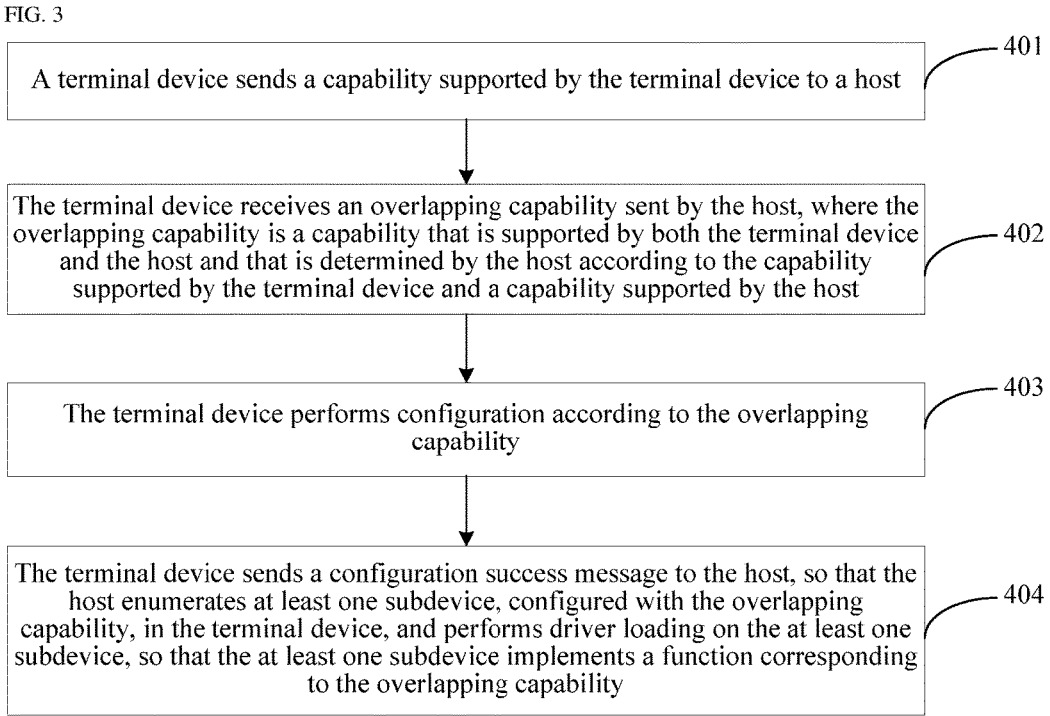
FIG. 4 is another flowchart of a capability configuration method for a terminal device according to an embodiment of the present invention.

Referring to FIG. 4, FIG. 4 is another flowchart of a capability configuration method for a terminal device according to an embodiment of the present invention. The method includes the following steps.

For details of step 401 to step 403, see step 301 to step 303.

Step 404: The terminal device sends a configuration success message to the host, so that the host enumerates at least one subdevice, configured with the overlapping capability, in the terminal device, and performs driver loading on the at least one subdevice, so that the at least one subdevice implements a function corresponding to the overlapping capability.

In this step, after performing corresponding configuration on the overlapping capability, the terminal device feeds back a configuration success message to the Host; after receiving the configuration success message, the Host enumerates at least one corresponding subdevice in the terminal device according to a result of an AND operation. For example, if the result of the AND operation is 0x9, two subdevices are enumerated, where one is Modem, and the other is BT. Next, the host performs driver loading on the two subdevices, so as to enable the two subdevices on which driver loading is performed to have a related function of the overlapping capability.

In this embodiment of the present invention, a terminal device (for example, a USB device) first notifies a host of a capability supported by the terminal device, so that the host determines a capability (that is, an overlapping capability) supported by both the host and the terminal device; and notifies the terminal device of the overlapping capability, so that the terminal device configures the overlapping capability. Next, the host may enumerate a subdevice configured with the overlapping capability, and install a driver for the subdevice. That is, when capabilities supported by the host and the terminal device are not exactly identical, the host negotiates with the terminal device about functions, and finds out a capability supported by both the terminal device and the host, to perform configuration and driver loading, which not only reduces a quantity of enumerations, but also improves user experience. Moreover, the host may also flexibly configure a function of the terminal device according to the capability of the terminal device and the capability of the host.

In addition, in this embodiment of the present invention, one USB device may be conveniently used to meet requirements of different users by providing different Host drivers, which therefore may reduce development efforts of a vendor of the USB device. In addition, the device vendor may further use one driver to support all USB devices, which reduces development and authentication costs of the Host driver.

Figure 5:
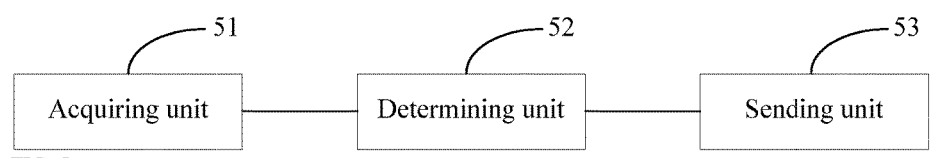
FIG. 5 is a schematic structural diagram of a host according to an embodiment of the present invention.

Based on the implementation processes of the foregoing methods, an embodiment of the present invention further provides a host, and a schematic structural diagram of the host is shown in FIG. 5. The apparatus includes: an acquiring unit 51, a determining unit 52, and a sending unit 53, where the acquiring unit 51 is configured to acquire a capability supported by a terminal device, where the acquiring unit 51 includes: a code receiving unit, a starting unit, and a parsing unit, where the code receiving unit is configured to receive a descriptor sent by the terminal device, where the descriptor includes MS_COMP_ID and MS SUB-COMP_ID; the starting unit is configured to start a corresponding driver according to the MS_COMP_ID; and the parsing unit is configured to parse the MS SUBCOMP_ID by using the driver started by the starting unit, to obtain the capability supported by the terminal device; the determining unit 52 is configured to determine, according to the capability supported by the terminal device and a capability supported by the host, a capability supported by both the terminal device and the host, and use the capability supported by both the terminal device and the host as an overlapping capability, where the overlapping capability is used by the terminal device to perform capability configuration; and the sending unit 53 is configured to send the overlapping capability to the terminal device, so that the terminal device configures the overlapping capability, where the sending unit 53 sends the overlapping capability to the terminal device, and specifically sends the overlapping capability to the terminal device by using a command defined by a vendor, so that the terminal device configures the overlapping capability.

For details of implementation processes of functions and effects of units in the host, see the implementation processes of corresponding steps in the foregoing methods, and details are not described herein again.

Figure 6:
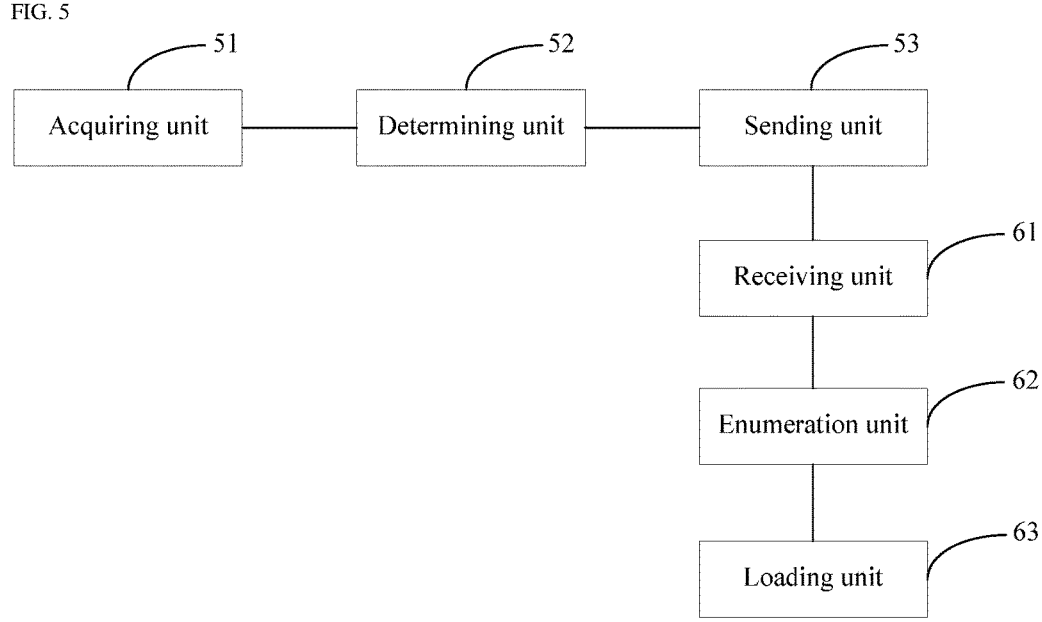
FIG. 6 is another schematic structural diagram of a host according to an embodiment of the present invention.

Optionally, in another embodiment, this embodiment is based on the foregoing embodiment in FIG. 5, the host further includes: a receiving unit 61, an enumeration unit 62, and a loading unit 63, and a schematic structural diagram of the host is shown in FIG. 6, where the receiving unit 61 is configured to receive a configuration success message sent by the terminal device. The enumeration unit 62 is configured to: when the receiving unit receives the configuration success message, enumerate at least one subdevice, configured with the overlapping capability, in the terminal device; and the loading unit 63 is configured to perform driver loading on the at least one subdevice, so that the at least one subdevice implements a function corresponding to the overlapping capability.

For details of implementation processes of functions and effects of units in the host, see the implementation processes of corresponding steps in the foregoing methods, and details are not described herein again.

Figure 7:
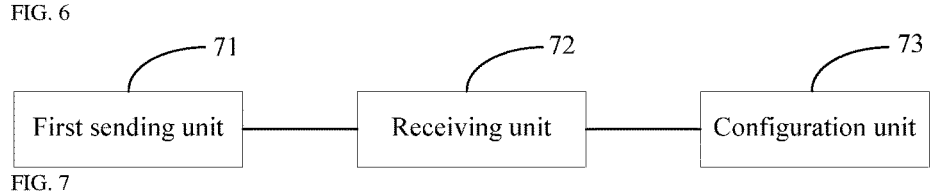
FIG. 7 is a schematic structural diagram of a terminal device according to an embodiment of the present invention.

Correspondingly, an embodiment of the present invention further provides a terminal device, and a schematic structural diagram of the terminal device is shown in FIG. 7. The terminal device includes: a first sending unit 71, a receiving unit 72, and a configuration unit 73, where the first sending unit 71 is configured to send a capability supported by the terminal device to a host, where the first sending unit 71 is specifically configured to send MS_COMP_ID and MS SUBCOMP_ID to the host by using a descriptor, so that the host starts a corresponding driver by using the MS SUB-COMP_ID, and parses the MS SUBCOMP_ID by using the driver, to obtain the capability supported by the terminal device; the receiving unit 72 is configured to receive an overlapping capability sent by the host, where the overlapping capability is a capability that is supported by both the terminal device and the host and that is determined by the host according to the capability supported by the terminal device and a capability supported by the host, where the receiving an overlapping capability sent by the host is specifically receiving, by using a command defined by a vendor, the capability that is supported by both the host and the terminal device and that is sent by the host; and the configuration unit 73 is configured to perform configuration on the overlapping capability.

For details of implementation processes of functions and effects of units in the terminal device, see the implementation processes of corresponding steps in the foregoing methods, and details are not described herein again.

Figure 8:
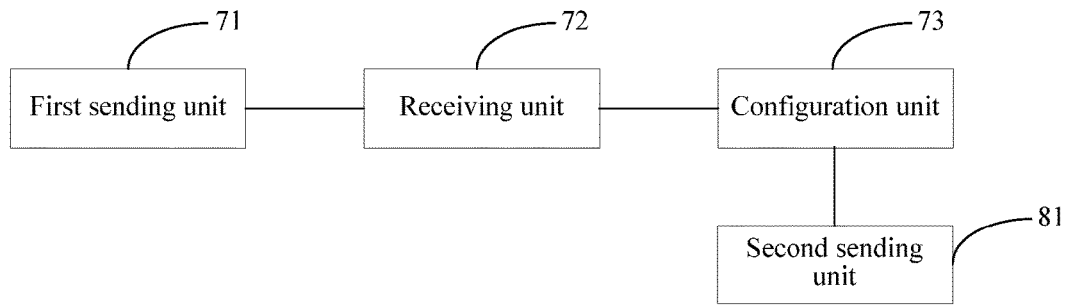
FIG. 8 is another schematic structural diagram of a terminal device according to an embodiment of the present invention.

Optionally, in another embodiment, this embodiment is based on the embodiment in FIG. 7, and the terminal device further includes: a second sending unit 81. A schematic structural diagram of the terminal device is shown in FIG. 8. The second sending unit 81 is configured to: after the configuration unit 73 successfully performs configuration according to the overlapping capability, send a configuration success message to the host, so that the host enumerates at least one subdevice, configured with the overlapping capability, in the terminal device, and performs driver loading on the at least one subdevice, so that the subdevice implements a function corresponding to the overlapping capability.

Optionally, the terminal device may be a USB device, or may be another storage device, which is not limited in this embodiment.

For details of implementation processes of functions and effects of units in the terminal device, see the implementation processes of corresponding steps in the foregoing methods, and details are not described herein again.

Figure 9:
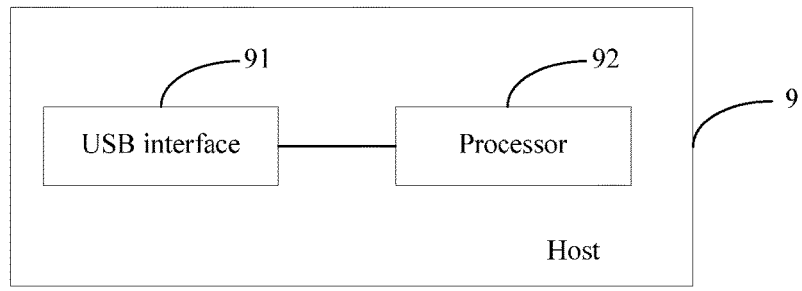
FIG. 9 is another schematic structural diagram of a host according to an embodiment of the present invention.

Correspondingly, an embodiment of the present invention further provides a host, and a schematic structural diagram of the host is shown in FIG. 9. The host 9 includes: a USB interface 91 and a processor 92, where the processor 92 is configured to acquire, through the USB interface 91, a capability supported by a terminal device; determine, according to the capability supported by the terminal device and a capability supported by the host, a capability supported by both the terminal device and the host, and use the capability supported by both the terminal device and the host as an overlapping capability, where the overlapping capability is used by the terminal device to perform capability configuration; and the processor 92 is further configured to send the overlapping capability to the terminal device through the USB interface 91, so that the terminal device configures the overlapping capability.

Optionally, the processor 92 is further configured to: when a configuration success message sent by the terminal device is received through the USB interface 91, enumerate at least one subdevice, configured with the overlapping capability, in the terminal device; and perform driver loading on the at least one subdevice, so that the at least one subdevice implements a function corresponding to the overlapping capability.

Optionally, that the processor acquires, through a USB interface, a capability supported by the terminal device includes: the host receives a descriptor sent by the terminal device, where the descriptor includes MS_COMP_ID and MS SUBCOMP_ID; and starts a corresponding driver according to the MS_COMP_ID, and parses the MS SUBCOMP_ID by using the driver, to obtain the capability supported by the terminal device.

Optionally, that the processor sends the overlapping capability to the terminal device through the USB interface includes: sending the overlapping capability to the terminal device by using a command defined by a vendor.

For details of implementation processes of functions and effects of the USB interface and the processor that are in the host, see the implementation processes of corresponding steps in the foregoing methods, and details are not described herein again.

Figure 10:
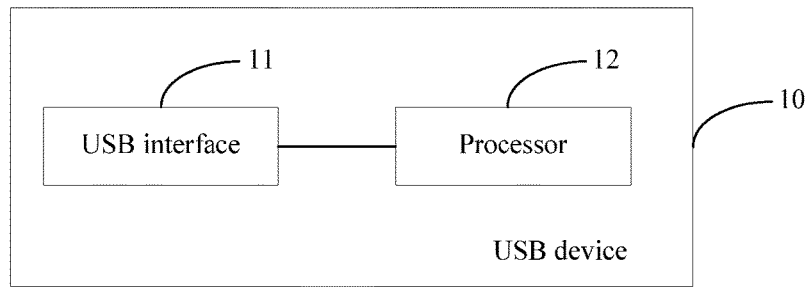
FIG. 10 is a schematic structural diagram of a USB device according to an embodiment of the present invention.

An embodiment of the present invention further provides a USB device, and a schematic structural diagram of the USB device is shown in FIG. 10. The USB device 10 includes: a USB interface 11 and a processor 12, where the processor 12 is configured to send, through the UEB interface 11, a capability supported by the USB device to a host; and receive, through the UEB interface 11, an overlapping capability sent by the host, where the overlapping capability is a capability that is supported by both the terminal device and the host and that is determined by the host according to the capability supported by the terminal device and a capability supported by the host; and the processor 12 is further configured to perform configuration according to the overlapping capability.

Optionally, the processor 12 is further configured to send a configuration success message to the host through the UEB interface 11, so that the host enumerates at least one subdevice, configured with the overlapping capability, in the terminal device, and performs driver loading on the at least one subdevice, so that the at least one subdevice implements a function corresponding to the overlapping capability.

Optionally, that the processor sends, through the USB interface, a capability supported by the USB device to a host includes: sending MS_COMP_ID and MS SUBCOMP_ID to the host by using a descriptor, so that the host starts a corresponding driver by using the MS SUBCOMP_ID, and parses the MS SUBCOMP_ID by using the driver, to obtain the capability supported by the terminal device.

Optionally, that the processor receives, through the USB interface, an overlapping capability sent by the host includes: receiving, by using a command defined by a vendor, a capability that is supported by both the capability of the host and the USB device and that is sent by the host.

For details of implementation processes of functions and effects of the USB interface and the processor that are in the USB device, see the implementation processes of corresponding steps in the foregoing methods, and details are not described herein again.

Figure 11:
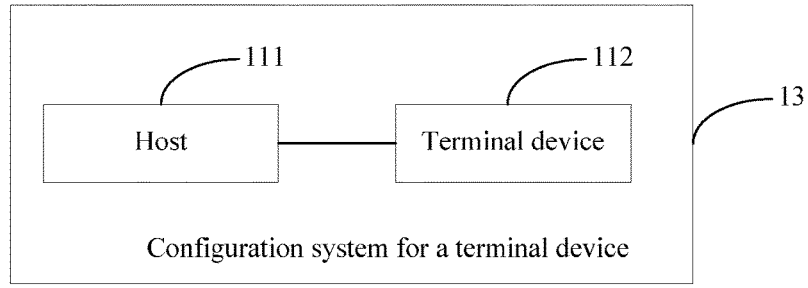
FIG. 11 is a schematic structural diagram of a configuration system for a terminal device according to an embodiment of the present invention.

Referring to FIG. 11, FIG. 11 is a schematic structural diagram of a configuration system for a terminal device according to an embodiment of the present invention. The configuration system 13 for a terminal device includes: a host 111 and a terminal device 112 connected to the host 111, where the host 111 is configured to acquire a capability supported by the terminal device 112; determine, according to the capability supported by the terminal device 112 and a capability supported by the host, a capability supported by both the terminal device 112 and the host 111, and use the capability supported by both the terminal device 112 and the host 111 as an overlapping capability, where the overlapping capability is used by the terminal device to perform capability configuration; and send the overlapping capability to the terminal device; and the terminal device 112 is configured to receive the overlapping capability, and perform configuration according to the overlapping capability.

Optionally, the terminal device 112 is further configured to send a configuration success message to the host 111; and the host 111 is further configured to: when a configuration success message sent by the terminal device 112 is received, enumerate at least one subdevice, configured with the overlapping capability, in the terminal device 112, and perform driver loading on the subdevice, so that the subdevice implements a function corresponding to the overlapping capability.

Optionally, that the host 111 acquires a capability supported by the terminal device 112 specifically includes: the host receives a descriptor sent by the terminal device, where the descriptor includes MS_COMP_ID and MS SUBCOMP_ID; and starts a corresponding driver according to the MS_COMP_ID, and parses the MS SUBCOMP_ID by using the driver, to obtain the capability supported by the terminal device.

For details of implementation processes of functions and effects of the host and the terminal device that are in the system, see the implementation processes of corresponding steps in the foregoing methods, and details are not described herein again.

For ease of understanding by a person skilled in the art, descriptions are provided below by using specific application instances.

Application Instance 1 of the Present Invention

It is assumed that a USB device needs to meet requirements of three different customers, where one customer requires a Modem+GPS+SD function, one customer requires a Modem function, and another customer requires a NetAdapter+BT function.

First, function codes of the USB device are defined:
00000001 (0x01): modem
00000010 (0x02): NetAdapter
00000100 (0x04): GPS
00001000 (0x08): BT; and
00010000 (0x10): SD The USB device reports MS_COMP USB\MS_COMP_HUAWEI&MS_SUBCOMP_1F to a host, indicating that a USB supports all the foregoing ports.

In addition, the host needs to provide three HOST drivers:
a capability value of a driver 1 is 0x15 (Modem+GPS+SD are needed);
a capability value of a driver 2 is 0x01 (only Modem is needed); and
a capability value of a driver 3 is 0x06 (Net Adapter and BT are needed).

The host negotiates with the USB device about capabilities, it is determined that the host and the USB device separately meet requirements of three different customers, and drivers are then separately provided to the three customers.

In this embodiment of the present invention, a device vendor needs to produce only one type of USB device, and requirements of users can be met as long as different Host drivers are provided to the users according to user types.

Application Instance 2 of the Present Invention

A USB vendor provides only one Host driver, but all USB products of this vendor need to be supported.

Function codes are defined:
00000001 (0x01): modem
00000010 (0x02): NetAdapter
00000100 (0x04): GPS
00001000 (0x08): BT; and
00010000 (0x10): SD A capability value of a driver 1 is 0x1F, that is, all ports are supported; a capability of a USB device 1: USB\MS_COMP_HUAWEI&MS_SUBCOMP_01, and there is only Modem; a capability of a USB device 2: USB\MS_COMP_HUAWEI&MS_SUBCOMP_11 and there are Modem+SD; . . . .

In this way, the device vendor can use one driver to support all USB devices, which reduces development and authentication costs of a Host driver.

In this embodiment of the present invention, a USB function can be flexibly configured according to a capability supported by a Host and a capability supported by a USB device, so as to meet different user requirements and improve user satisfaction.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Based on the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments of the present invention.

The foregoing descriptions are merely exemplary implementation manners of the present invention. It should be noted that a person of ordinary skill in the art may make several improvements or polishing without departing from the principle of the present invention and the improvements or polishing shall fall within the protection scope of the present invention.

What is claimed is:

1. A method, comprising:
acquiring, by a host, an indication from a terminal device, wherein the indication indicates a plurality of capabilities supported by the terminal device;
determining, by the host according to the plurality of capabilities supported by the terminal device that are indicated by the indication and a plurality of capabilities supported by the host, a plurality of capabilities supported by both the terminal device and the host, and using the plurality of capabilities supported by both the terminal device and the host as a plurality of overlapping capabilities, wherein the plurality of overlapping capabilities are used by the terminal device to perform capability configuration;
sending the plurality of overlapping capabilities to the terminal device;
in response to receiving a configuration success message sent by the terminal device, enumerating a plurality of sub-devices in the terminal device, each of the plurality of sub-devices being respectively configured with an overlapping capability of the plurality of overlapping capabilities; and
performing driver loading on each of the plurality of sub-devices, so that each of the plurality of sub-devices respectively implements a function corresponding to the plurality of overlapping capabilities.

2. The method according to claim 1, wherein acquiring the indication indicating the plurality of capabilities supported by the terminal device comprises:
receiving, by the host, a descriptor sent by the terminal device, wherein the descriptor comprises MS_COMP_ID and MS SUBCOMP_ID; and
starting, by the host, a corresponding driver according to the MS_COMP_ID, and parsing the MS SUBCOMP_ID by using the corresponding driver, to obtain the plurality of capabilities supported by the terminal device.

3. A method, comprising:
sending, by a terminal device, information identifying a plurality of capabilities supported by the terminal device to a host;

receiving, by the terminal device, information identifying a plurality of overlapping capabilities sent by the host, wherein the plurality of overlapping capabilities is a plurality of capabilities that are each supported by both the terminal device and the host and that are determined by the host according to the plurality of capabilities supported by the terminal device and a plurality of capabilities supported by the host;

performing, by the terminal device, configuration according to the plurality of overlapping capabilities;

receiving, by the terminal device from the host, an identification of a plurality of sub-devices of the terminal device; and in response to receiving the identification of the plurality of sub-devices of the terminal device, loading, by the terminal device, a plurality of drivers that respectively correspond to a sub-device of the plurality of sub-devices, wherein loading the plurality of drivers causes the plurality of sub-devices to be configured to implement functions corresponding to the plurality of overlapping capabilities.

4. The method according to claim 3, further comprising: sending, by the terminal device, a configuration success message to the host.

5. The method according to claim 3, wherein sending the information identifying the plurality of capabilities supported by the terminal device to the host comprises:

sending, by the terminal device, MS_COMP_ID and MS SUBCOMP_ID to the host using a descriptor, so that the host starts a corresponding driver using the MS_COMP_ID, and parses the MS SUBCOMP_ID using the corresponding driver, to obtain the plurality of capabilities supported by the terminal device.

6. A host, comprising:

a processor; and a computer-readable storage medium storing a program to be executed by the processor, the program including instructions for:

acquiring an indication from a terminal device, wherein the indication indicates a plurality of capabilities supported by the terminal device;

determining, according to the plurality of capabilities supported by the terminal device and a plurality of capabilities supported by the host, a plurality plurality of capabilities supported by both the terminal device and the host, and using the plurality of capabilities supported by both the terminal device and the host as a plurality of overlapping capabilities, wherein the plurality of overlapping capabilities are used by the terminal device to perform capability configuration;

sending the plurality of overlapping capabilities to the terminal device;

in response to receiving a configuration success message from the terminal device, enumerating a plurality of sub-devices of the terminal device that are respectively configured with a capability of the plurality of overlapping capabilities, in the terminal device; and performing driver loading on each of the plurality of sub-devices, so that each of the plurality of sub-devices respectively implements a function corresponding to the plurality of overlapping capabilities.

7. The host according to claim 6, wherein the program further includes instructions for:

receiving a descriptor sent by the terminal device, wherein the descriptor comprises MS_COMP_ID and MS SUBCOMP_ID;

starting a corresponding driver according to the MS_COMP_ID; and parsing the MS SUBCOMP_ID by using the corresponding driver, to obtain the plurality of capabilities supported by the terminal device.

8. The method according to claim 1, wherein the indication comprises a character string, and each character in the character string indicates a different capability of the terminal device.

9. The method according to claim 1, wherein the indication comprises a bit map comprising a plurality of bits, and each bit in the bit map indicates a different capability of the terminal device.

10. The method according to claim 9, wherein determining the plurality of capabilities supported by both the terminal device and the host comprises performing an AND operation using the bit map received from the terminal device and a bit map of the host.

11. The method according to claim 3, wherein the terminal device comprises at least two of a modem sub-device, a bit torrent sub-device, a network adapter sub-device, and a global positioning system sub-device.

12. The method according to claim 3, wherein sending the information regarding the plurality of capabilities supported by the terminal device to the host comprises sending a bit map to the host, wherein each bit in the bit map indicates a different function of the terminal device.

13. The host according to claim 6, wherein the indication comprises a character string, and each character in the character string indicates a different capability of the terminal device.

14. The host according to claim 6, wherein the indication comprises a bit map, and each bit in the bit map indicates a different capability of the terminal device.

15. The host according to claim 14, wherein determining the plurality of capabilities supported by both the terminal device and the host comprises performing an AND operation using the bit map received from the terminal device and a bit map of the host.

* * * * *